(12) United States Patent
Bacon et al.

(10) Patent No.: US 7,743,401 B2
(45) Date of Patent: Jun. 22, 2010

(54) SYSTEMS AND METHODS OF DECODING AND PROCESSING TRANSACTIONS FOR AN ADDRESSABLE CABLE TELEVISION TAP

(75) Inventors: Kinney C. Bacon, Lawrenceville, GA (US); Joel P. Jenkins, Lawrenceville, GA (US); Alan J. Schlenz, Snellville, GA (US); Jaegyoo Seol, Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1364 days.

(21) Appl. No.: 10/745,452

(22) Filed: Dec. 23, 2003

(65) Prior Publication Data

US 2004/0139476 A1 Jul. 15, 2004

Related U.S. Application Data

(63) Continuation of application No. 09/443,231, filed on Nov. 18, 1999, now abandoned.

(51) Int. Cl.
H04N 7/173 (2006.01)

(52) U.S. Cl. .................. 725/127; 725/128; 725/149; 725/116; 725/146

(58) Field of Classification Search ............ 725/127, 725/128, 116, 146, 149
See application file for complete search history.

(56) References Cited

U.S. PATENT DOCUMENTS

| | | | | |
|---|---|---|---|---|
| 5,058,198 A | * | 10/1991 | Rocci et al. ............ | 725/149 |
| 5,434,866 A | * | 7/1995 | Emerson et al. ......... | 370/476 |
| 6,130,703 A | * | 10/2000 | Spriester et al. ......... | 725/127 |
| 6,463,588 B1 | * | 10/2002 | Jenkins et al. .......... | 725/127 |
| 6,570,928 B1 | * | 5/2003 | Shibata ................. | 375/257 |
| 6,694,517 B1 | * | 2/2004 | James et al. ........... | 725/127 |
| 2003/0149988 A1 | * | 8/2003 | Ellis et al. ............. | 725/87 |

* cited by examiner

Primary Examiner—Christopher Kelley
Assistant Examiner—Farzana Hossain
(74) Attorney, Agent, or Firm—Tarolli, Sundheim, Covell & Tummino LLP

(57) ABSTRACT

Systems and methods for decoding and processing back-to-back transactions for an addressable cable television tap. The addressable tap includes an input port for receiving an input signal and output ports for providing outgoing signals to receiving equipment and a controller for providing addressable per port (RF) switching. The controller is adapted to communicate with multiple addressable ports. The controller also includes storage for storing the remaining portions of partially processed commands. Further, the addressable tap includes a relay for enabling or disabling signals to the addressable output ports. Processing commands in the addressable tap includes receiving continuous commands having back-to-back transactions, from a headend and forwarding signals to receiving equipment. For a connect request, the addressable tap accepts the connect request as valid when, upon decoding each transaction, two consecutive transactions out of six are the same, and for a disconnect request, accepting the disconnect request as valid when, upon decoding each transaction, four consecutive transactions out of twelve transactions are the same.

11 Claims, 6 Drawing Sheets

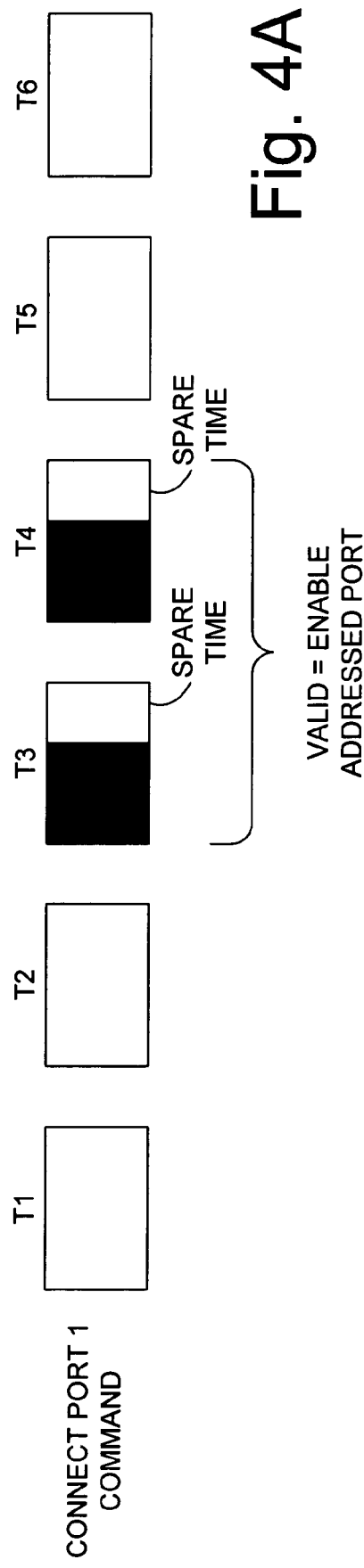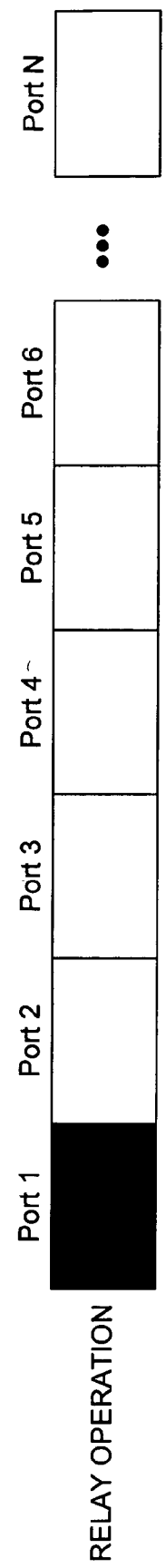
Fig. 4A
Fig. 4B

SYSTEMS AND METHODS OF DECODING AND PROCESSING TRANSACTIONS FOR AN ADDRESSABLE CABLE TELEVISION TAP

RELATED APPLICATIONS

The present application is a continuation of U.S. patent application Ser. No. 09/443,231 entitled Systems and Methods of Decoding and Processing Transactions for an Addressable Cable Television Tap filed Nov. 18, 1999, now abandoned.

FIELD OF THE INVENTION

This invention relates to cable television taps, and, more particularly, to systems and methods of decoding and processing transactions in an addressable cable television tap.

BACKGROUND OF THE INVENTION

Cable television (CATV) systems typically include transmission equipment, such as headend equipment that receives satellite signals and demodulates the signals to baseband. The baseband signal is then converted to a radio frequency (RF) signal or optical signal for transmission from the headend to receiving equipment, such as a set top box. The set top box couples to the subscriber's equipment, such as, for instance, a television set.

Cable television taps are situated along the CATV distribution system to split the signals off to the receiving equipment. Taps serve to enable subscriber output ports to provide a signal to a subscriber. Taps usually include an incoming port for receiving RF signals from the headend and outgoing ports for splitting off portions of the RF signal to the set top box. Algorithms for decoding and processing commands in certain set top boxes requires a delay time between commands to ensure complete command decoding and processing. Thus, set top and other addressable devices were designed to handle one command at a time.

Conventional addressable taps normally include a microprocessor and input and output ports. The microprocessor interprets the commands from the headend and provides the signal to the designated addressed subscriber output port. Each output port corresponds to a subscriber signal drop location. Normally, a tap contains 2, 4, or 8 subscriber output ports, thereby serving 2, 4 or 8 subscribers. A properly operating tap is necessary for a subscriber to receive cable television service. Numerous factors can cause a tap to malfunction. For instance, because the tap has only a single microprocessor, it can become overloaded by a continuous flow of commands and consequently drop commands, thereby causing subscribers to incorrectly receive or not receive service.

Further, taps can be damaged by environmental factors. For example, strong winds, lightening, or power surges can cause the tap to malfunction, which requires resetting the tap. Resetting the tap can occur remotely from commands sent from the headend. U.S. patent application Ser. No. 09/401,477 filed Sep. 22, 1999, entitled "Method and Apparatus for Restoring Port Status in a Cable Television Tap," assigned to Scientific-Atlanta discloses mechanisms for periodically refreshing ports of a tap to correct inadvertent status changes and is incorporated by reference in its entirety herein. Although refreshing the port status allows the outgoing ports of the tap to maintain proper status, if a command from the headend is being processed when a refresh command is sent, the in process command may be dropped.

Therefore a need exists for an addressable tap that utilizes the existing microprocessor, transmission protocols and receiving equipment in a cable television system and can process a continuous stream of addressable commands.

SUMMARY OF THE INVENTION

This invention addresses the prior problems and provides for systems and methods of decoding and processing continuous transactions in an addressable cable television tap in a communications system such as a cable television system. This cable television system includes a transmitter for transmitting signals, a distribution system for transporting the signals and an addressable tap coupled to the distribution system for controlling and splitting a portion of the signal and providing that signal to receiving equipment. The addressable tap also includes ports for receiving an input signal and providing outgoing signals to the receiving equipment and a controller for providing addressable per port (RF) switching. The controller of the addressable tap is adapted to communicate with multiple addressable ports. The controller also includes storage for storing the remaining portions of partially processed commands. The addressable tap also includes a relay for enabling or disabling signals to the addressable output ports.

Another aspect of this invention includes a method of processing commands in an addressable tap where the tap is adapted to receive signals from a communications system and to process data commands and forward the signals to receiving equipment. The tap configures to read and interpret commands. For a connect request, the addressable tap accepts the connect request as valid when, upon decoding each transaction, two consecutive transactions out of six are the same. For a disconnect request, the addressable tap accepts the disconnect request as valid when, upon decoding each transaction, four out of twelve are the same. Finally, the addressable tap processes the connect or disconnect request.

In another aspect of this invention, the addressable tap provides for periodically refreshing port status with proper enable or disable commands so that the subscriber continues to receive or not receive proper service. In addition to supporting the periodic refresh functionality, the addressable tap of this invention supports accepting, decoding and interpreting continuous back-to-back commands without dropping any commands. Within the commands are back-to-back transactions. Preferably, if one command is being processed when another command is received, a portion of the first command is put in a queue, the second command processed and the remaining portion of first command processed in slack time of the system. In a preferred embodiment, the queuing process includes a flag method for storing unprocessed information until serviced in the addressed device.

One, multiple or combinations of the objects of this invention include the following:

To provide an addressable tap adapted to receive and process a continuous stream of commands without losing any commands.

To provide an addressable tap that is remotely controllable at the headend of a cable television or communications system.

To provide an addressable tap where its micro-controller can handle addressable commands to more than one outgoing port.

To provide an addressable tap having a micro-controller configured to process multiple commands utilizing a queuing arrangement of available time slots.

To provide an addressable tap that is compatible with existing set top boxes and addressable transmitter (ATX) proprietary protocol.

Other objects and advantages of this invention will become apparent to those skilled in the art upon review of this document and the Figures.

BRIEF DESCRIPTION OF THE DRAWINGS

FIGS. 4A, 4B, 4C and 4D show an overview of the relay operation for connect and disconnect commands.

DETAILED DESCRIPTION

Figure 1:
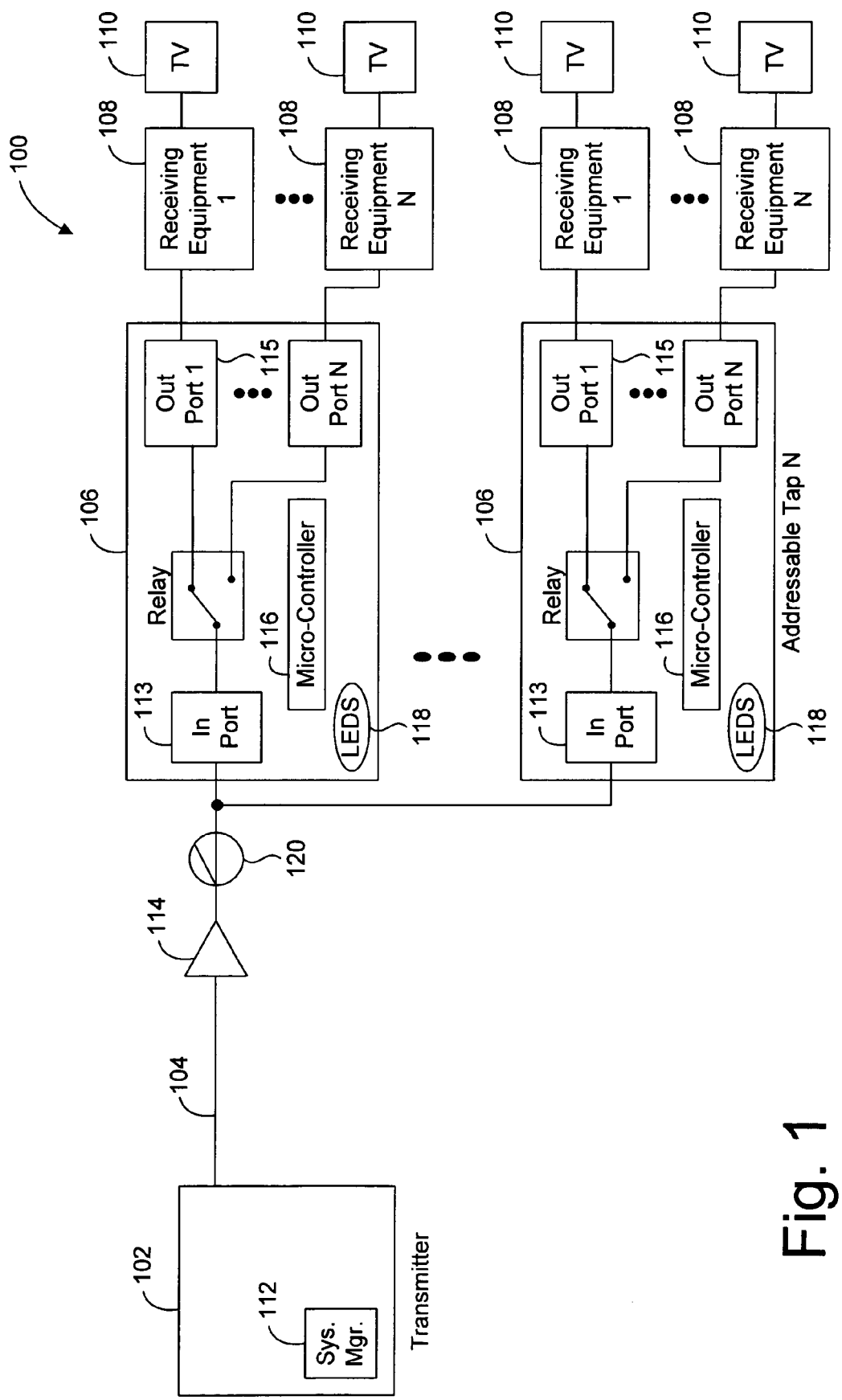
FIG. 1 shows a block diagram of a communications system, such as a cable television system including an addressable tap.

FIGS. 1-4 show various aspects of systems and methods of decoding and processing transactions in an addressable tap. FIG. 1 shows a block diagram of a communications system 100, such as a cable television (CATV) system. The communications system 100 includes a transmitter 102, a distribution system 104, an addressable tap 106 and receiving equipment 108 coupled to a subscriber's equipment, such as a television set 110. Preferably, the transmitter 102 embodies headend equipment that receives satellite television signals and provides programs and modulation of the signals to subscribers. A system manager 112 assists in controlling the headend. Preferably, the receiving equipment 108 includes a set top box such as one provided by Scientific-Atlanta, Inc. of Norcross, Ga. The transmitted signals can, for instance, by radio frequency (RF) signals; however, preferably, the signals are optical signals transmitted over a fiber optic cable. If optical signals are transmitted by the headend 102, intermediate nodes (not shown) in the CATV system 100 convert the optical signal to RF signals that are thereafter routed to a distribution system 104. The distribution system 104 can encompass multiple distribution lines that can include local or long distance trunk lines, such as coax cable lines, directional couplers 120, and amplifiers 114 that provide additional power to spread the signals to multiple addressable taps 106 along the CATV system 100.

Addressable taps 106 distribute signals to subscriber's homes. The addressable tap 106 is an intelligent device that interprets and processes commands from the headend 102. Each addressable tap 106 receives an incoming signal at an input port 113 and routes the signal to receiving equipment 108 via output ports 115 enabled to forward the signal. Each addressable tap 106 can include multiple subscriber output ports 115 based on the number of subscribers coupled to the addressable tap 106.

An addressable tap 106 utilizes numerous commands including connect and disconnect, and outbound addressable commands used to operate a set top box 108. A suitable set top box for use with this invention is the Scientific-Atlanta model 8580 set top box. In a preferred embodiment, the addressable tap 106 includes a multimedia stretch tap and an embedded computer, such as a micro-controller 116 providing addressable multi-state port switching. The micro-controller 116 of the addressable tap 106 performs operational functions, such as receiving data sent from the headend 102, deciphering it, and carrying out any instructions. The micro-controller 116 in each addressable tap 106 contains a unique subscriber address range so any individual subscriber's output port 115 can be controlled from the headend 102.

Each subscriber port 115 has its own unique address. The addressable tap 106 firmware and data protocol is compatible with headend 102 system manager software, and ATX protocol emulating the Scientific-Atlanta 8580 analog set top box with modified lower channel authorization transactions. The addressable tap 106 provides per port RF switching (i.e. on and off) from a remote location such as the head-end 102. The subscriber ports 115 can be either disabled, so that a signal is not transferred from that port, or enabled for transmission. The output ports 115 of the addressable tap 106 remain active at all times with the micro-controller 116 having capabilities for turning on or off the forward or reverse path on each port 115. The system manager 112 includes a programming section that allows a user to program enablement or disablement of the output ports 115 of the addressable tap 106. The micro-controller 116 also controls a LED status display 118 of the addressable tap 106 that indicates power, receiving data, and port conditions. Typically two, four, or eight subscribers connect to a single addressable tap 106. Optionally, the addressable tap 106 has the capability to connect to more subscribers, such as, for instance, sixteen subscribers. The set top box 108 serves to demodulate the signal and provides subscribed programs viewable on the subscriber's television set 110 or other display device.

The addressable tap 106 can include a faceplate assembly having a front-end board, a power supply board and a switchboard. The front-end board further includes an RF front end/ coupler, a receiver and the digital micro-controller 116. The power supply board contains the power supply. The switchboard further includes a splitter/switch, port powering and status indicators.

Figure 2:
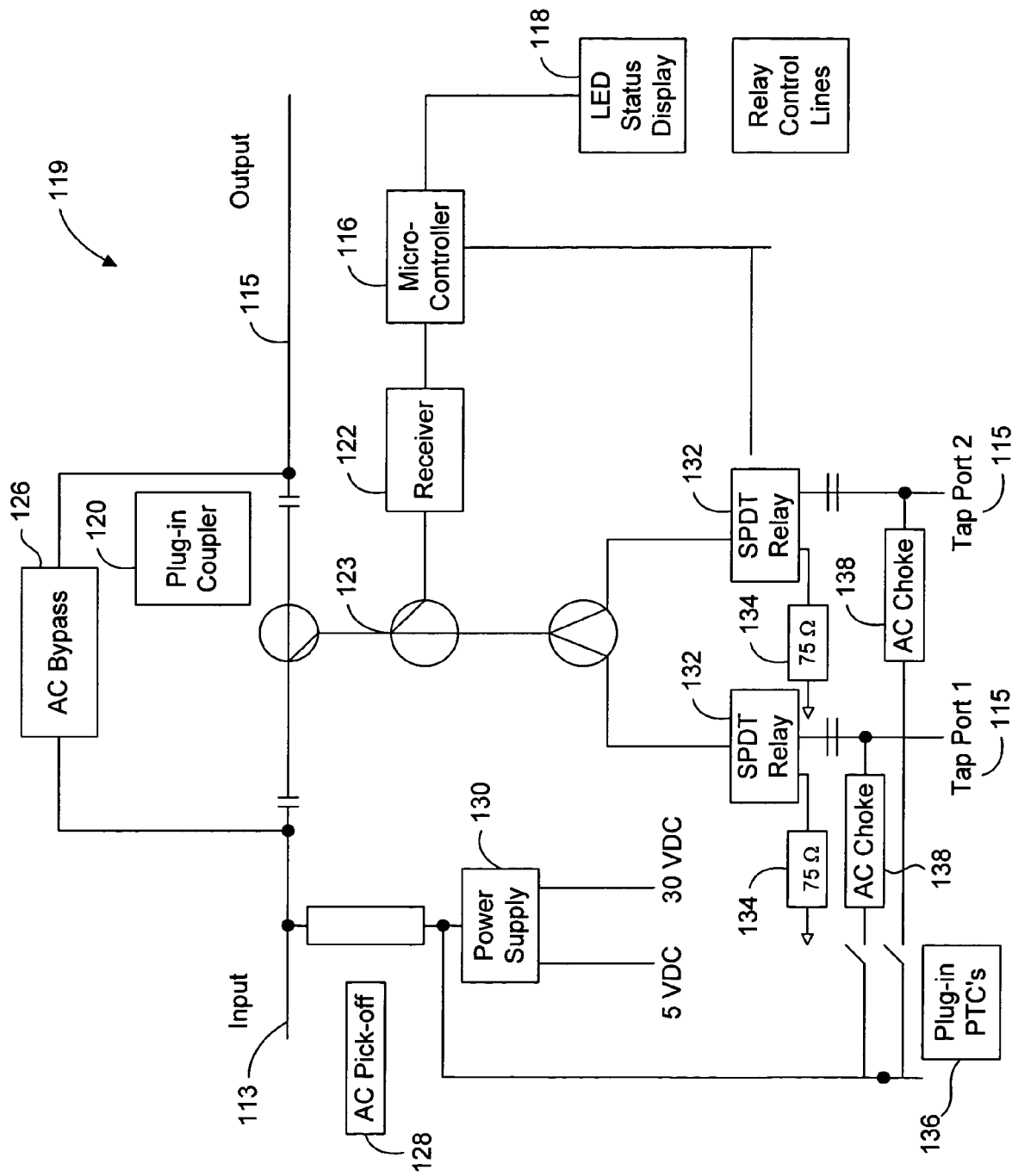
FIG. 2 shows an electrical block diagram of the addressable tap utilized in the communications system of FIG. 1.

FIG. 2 shows an electrical block diagram 119 of the addressable tap 106 utilized in the communications system 100 of this invention.

A RF front-end/coupler receives RF signal and alternating current (AC) from the input 113. Some of the RF signal is coupled off and the rest is passed to the output utilizing a plug-in directional coupler 120. In addition, one leg of the directional coupler 120 includes a coupler that sends the RF signal to the receiver 122. The remaining portion of the RF signal on the coupled leg is passed to the Splitter/Switch module 123. Most AC current passes from input to output through a high current AC bypass coil 126; however, some is picked off with a smaller RF choke 128 and sent to the power supply module 130 and port powering module.

The receiver 122 takes data that has been frequency shift key (FSK) modulated onto an RF carrier and demodulates it back down to 5V digital data. The demodulated data is sent to the micro-controller 116.

The micro-controller 116 receives the data sent from the receiver 122, deciphers it, and carries out any instructions. The micro-controller 116 in each addressable tap 106 contains a unique address range that is permanently stored in a separate non-volatile memory chip, so any individual addressable tap 106 and subscriber port 115 can be controlled from the headend 102. The firmware and data protocols are compatible with system manager 112 software. The micro-controller 116 is capable of turning on or off each output port 115. Additionally, the micro-controller 116 controls the LED status display 118 that indicates if DC power is present, if data is being received, and the state of each port 113, 115.

The power supply 130 converts the AC input voltage to a regulated DC voltage for powering. Preferably, the power supply 130 is packaged as a plug in module that can be easily replaced by technicians on site.

The splitter and switch module 123 takes the RF input and runs it through log₂n splitter stages (now shown; where n=number of tap ports) to evenly divide the RF energy between all of the tap output ports 115. After the signal is split, it passes to a RF relay 132. The relay 132 either passes the RF through (i.e., "on" mode), or terminates the signal into a 75 ohm resistor (i.e., "off" mode) 134. The relays 132 are controlled by the micro-controller 116. Preferably, the relays 132 are latching types, so once they are set in a certain position they hold their state, without requiring power, until the micro-controller 116 provides the control voltage to change them.

The port powering portion of the switchboard has the capability of sending AC power down the drop on each port 115. Port powering is enabled by plugging a positive temperature coefficient (PTC) 136 into the socket corresponding to the port 115 that needs power. Once plugged in, the PTC will send AC to the port 115 through an RF choke 138. The PTC's will limit the amount of AC current that can be drawn by the port 115. PTC's can be accessed through a technician access panel on the addressable tap 106, which allows port AC connect and disconnects without removing the faceplate from the back housing of the addressable tap 106.

The status of port condition, local power, and the presence of a data carrier is indicated by an LED in the LED status display 118 located in the technician access panel of the addressable tap 106. One LED per port is used to indicate if the port is passing the RF signal or terminated. An additional LED can be used to indicate local power or data carrier status.

In a preferred embodiment, the addressable tap 106 utilizes an 8 bit Motorola micro-controller 116 (also referred to as a microprocessor) and firmware developed with assembly language. The authorization command (also referred to as connect command or connect authorization) to turn on a subscriber port 115 is made of six transactions. The addressable tap 106 recognizes the connect command as valid when two of the transactions match. Command decoding occurs transaction by transaction, which avoids the problem of dropping good transactions.

Figure 3A:
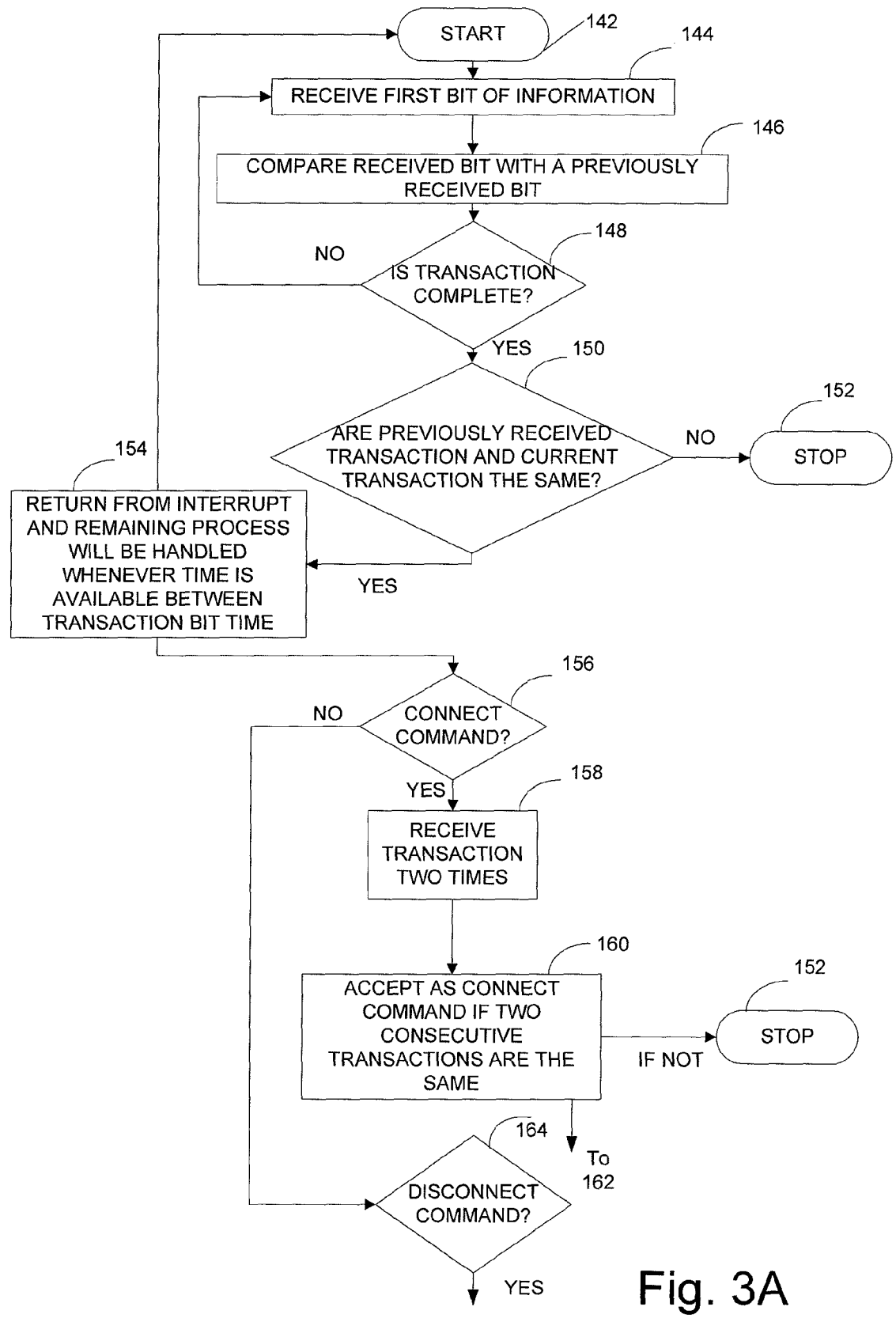
FIGS. 3A and 3B show a flow chart of an operation performed by the micro-controller of the addressable tap of FIG. 1.
Figure 3B:
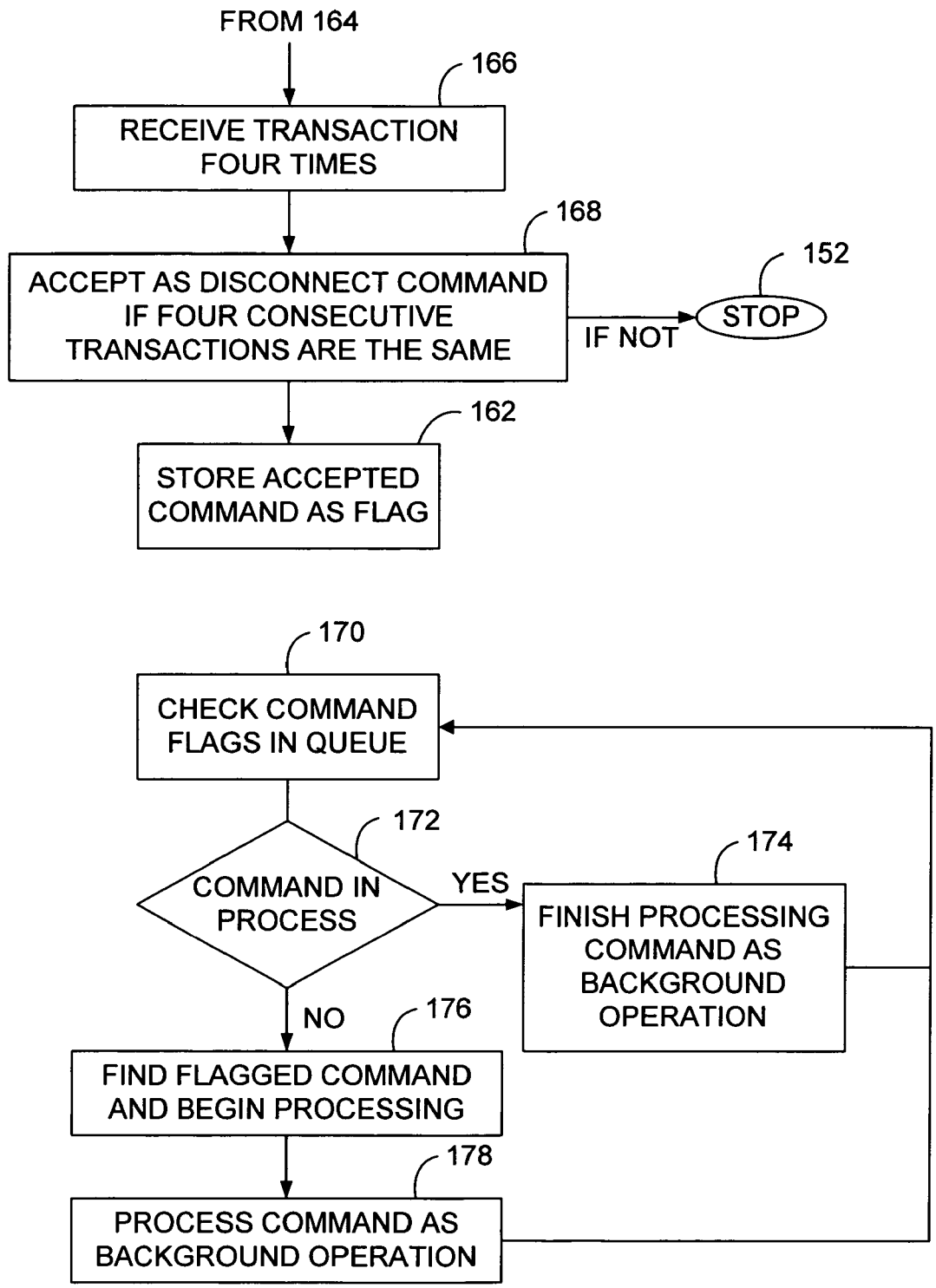

FIGS. 3A and 3B show a flow chart of an operation performed by the micro-controller 116 that provides for handling consecutive back-to-back commands sent to the addressable tap 106 without losing commands. The process starts at 142. At 144 the micro-controller 116 receives a first bit of a transaction sent from the headend 102. At 146 the first bit is compared to a previously received bit by the micro-controller 116. This process continues until the transaction is complete at 148. If the transaction is not complete, the process again receives the first bit of transaction at 144. If complete, at 150, a comparison is done to determine if the current transaction and the previously received transaction are the same. If not, the process stops at 152. If they are the same, at 154 the micro-controller 116 returns from interrupt and the remaining process is handled during any available slack time. For a connect command, at 156, the headend 102 sends a transaction six times and is received at the micro-controller 116. At 158, a determination is made as to whether the transaction has been received two times. At 160, the connect command is accepted as valid if two consecutive transactions out of the six sent are the same. If not, at 152, the process stops. If they are the same, at 162, the micro-controller 116 stores the accepted command as a flag. If, at 156, the command is not a connect command, a determination is made, at 164, as to whether the command is a disconnect command.

The process continues on FIG. 3B. If the command is a disconnect command, at 166, the transaction is received four times from the headend 102. At 168, the disconnect command is accepted if four consecutive transactions out of twelve are the same. If not, the process stops at 152. If they are the same, at 162, the micro-controller 116 stores the accepted command as a flag. At 170 a check of the command flags in queue is performed. At 172, if a command is in process, then that command will be processed as a background operation at 174. If a command is not in process, then at 176, the flagged command is found and processing begins. At 178, the command is processed as a background operation.

The micro-controller 116 performs basic mandatory tasks; however, the entire available transaction time is not completely utilized performing these tasks. Mandatory tasks can include powering up, bit decoding, data verification, and comparison with previously received transactions. In a preferred embodiment, the total transaction time for disconnect and connect authorizations are 2,080 and 5,408 micro-seconds, respectively. However, approximately 265 micro-seconds of spare time remains after performing the mandatory functions in each transaction. This available spare time is used to store command transactions requests and to operate the relay. The relay function stores in a flag, which is a separate memory storage area in the micro-controller and is processed during slack time. This resolves the flaw in the set top algorithm when it is used for multiple addressed devices and allows back-to-back commands, having back-to-back transactions, to be processed. The conventional set top box is a single address device and current headend equipment inserts a predetermined delay between commands when those commands are addressed to the set top box. Thus in the conventional set top box, when received commands are not executed before the next command arrives, either previous command is erased or to keep it, incoming transaction must be ignored.

However, with this invention if a sequence of commands for different addresses are transmitted from the headend 102, delay time is not inserted because set top box 108 commands are sent to different addressable devices. Therefore, a multiple address device like the addressable tap 106 decodes, processes and executes all commands if they belong to the same housing. Because the flag method can store new commands until old commands are serviced, a queue of transactions is built up without losing received or incoming data. The left over time scattered throughout the time stream is used to process the first command and operate the relay so that relay operation time does not disrupt the decoding of an incoming transaction allowing relay functions to operate in the background. This invention provides capability to stack in the flag information necessary to operate relays for multiple transactions. At 150, the process restarts with receipt of the next command.

Incoming commands received from the headend can also include port refresh commands. Port refresh serves to avoid inadvertent enabling or disabling of subscriber's service by periodically refreshing, or restoring, the proper status of each output port 115. In a preferred embodiment, the first port refresh occurs within about 3.5 minutes after power-up. The second refresh occurs about an hour later. All subsequent refreshes occur at one hour intervals. Currently processing commands are not lost when a port refresh occurs because the port refresh command can be stored for later processing using this invention if a received command is currently processing.

Figure 4C:
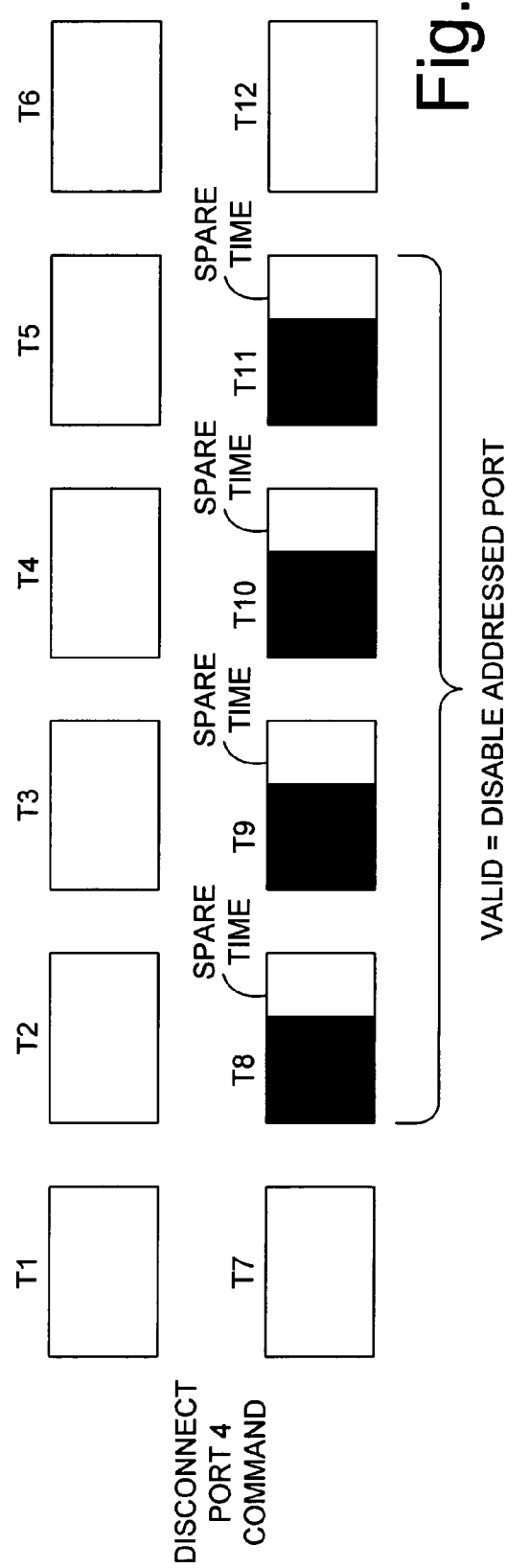
Figure 4D:
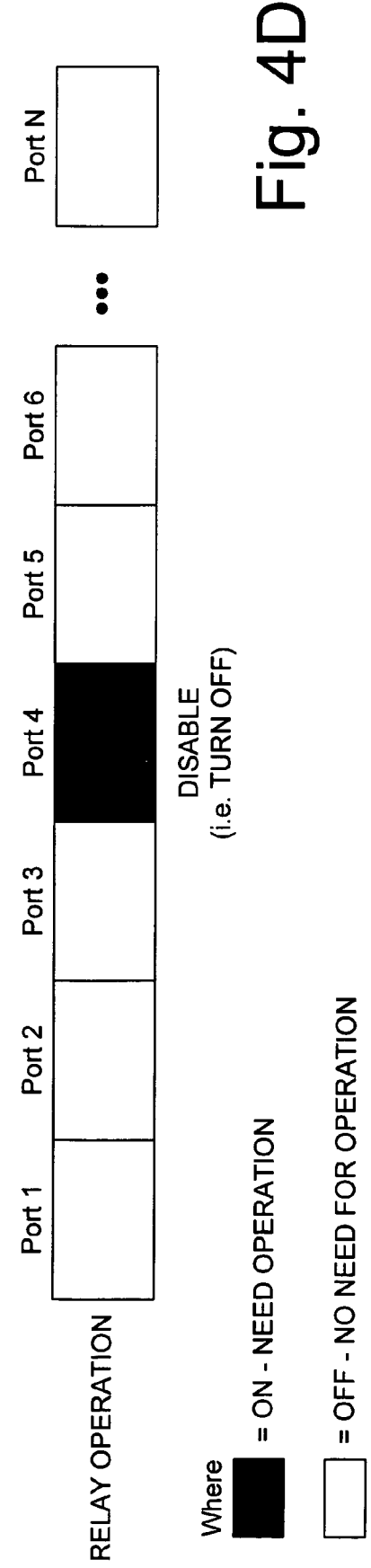

As discussed above, a connect command is accepted as valid when two consecutive transactions out of six transactions match. A disconnect command is accepted as valid when four consecutive transactions out of twelve match. When a command is accepted as valid, the relay operates and the addressable port is enabled or disabled. FIGS. 4A and 4B show an overview of the relay operation for connect and disconnect commands. FIG. 4A shows a connect command that is accepted. As shown in FIG. 4B, when two transactions match, the addressable port, for instance port one is enabled and the subscriber coupled to port one has their cable service turned on. FIG. 4C shows four of twelve disconnect transactions matching to disable the addressable port. FIG. 4D shows disabling of service to the subscriber coupled to port 4.

In an alternative embodiment of this invention, the firmware provides for supporting more demanding tasks such as a 16 ports addressable tap or adding additional state functions.

An advantage of this invention is that the flag method stores processed information until it can be serviced by the addressable tap while decoding incoming transactions. This queuing of transactions allows for processing of continuous back-to-back commands having back-to-back transactions, without losing information, thereby greatly increasing performance.

Another advantage of this invention is that it overcomes the previous problem of not being able to process transactions when the hourly refresh of the addressable tap occurred, which caused a 15 PPM error rate.

Still another advantage of this invention is that it allows for a single micro-controller in the addressable tap to receive a multitude of addresses without modification of existing headend equipment.

Yet another advantage of the invention is that the addressable tap's single micro-controller can handle more than eight ports without sacrificing performance.

In light of the foregoing disclosure of this invention and description of certain preferred embodiments, those who are skilled in this area of technology will readily understand that various modifications and adaptations can be made without departing from the true scope and spirit of this invention. All such modifications and adaptations are intended to be covered by the following claims.

What is claimed is:

1. A method in an addressable tap for receiving signals and for providing a portion of the signals to an appropriate receiving device, the method comprising the steps of:
    receiving a plurality of signals, each of the plurality of signals including an address and a command that is associated with an attached receiving device;
    determining the correct attached receiving device by accessing a plurality of addresses stored in memory, wherein each address correlates with a port on the addressable tap;
    storing respective received commands as flags in a queue; and
    routing the portion of the signals to the appropriate receiving device,
    wherein a connect command is stored as a flag in the queue after two consecutive connect command transactions are received from a head end, and a disconnect command is stored as a flag in the queue after four consecutive disconnect command transactions are received from the head end, and a port refresh command is stored for later processing if a previously received command is currently processing,
    wherein a first received command for a first port is processed and a second received command for a second port different from the first port is buffered, using the flags in the queue, until the processing of the first received command is complete.

2. The method of claim 1, wherein the processing step of the received commands utilizes system spare time.

3. An addressable tap coupled to a distribution system for controlling and splitting signals and providing the signals to receiving equipment, the addressable tap comprising:
    ports for receiving an input signal and for providing outgoing signals to the receiving equipment;
    a faceplate assembly having a front-end board, a power supply board, and a switchboard;
    a controller for providing addressable per port switching, the controller adapted to communicate with multiple addressable ports, the controller for processing the signals and routing commands from the processed signals to an appropriate addressable port; and
    a memory for storing unprocessed commands as flags in a queue,
    wherein the signals include an address that is associated with each addressable port,
    wherein a connect command is stored as a flag in the queue after two consecutive connect command transactions are received from a head end, and a disconnect command is stored as a flag in the queue after four consecutive disconnect command transactions are received from the head end, and a port refresh command is stored for later processing if a previously received command is currently processing, and
    wherein a first received command for a first port is processed and a second received command for a second port different from the first port is buffered, using the flags in the queue, until the processing of the first received command is complete.

4. The addressable tap of claim 3, wherein the controller is adapted to turn on or turn off a forward or reverse signal path on each port.

5. The addressable tap of claim 4, the addressable tap further comprising a relay for enabling or disabling signals to the addressable ports.

6. The addressable tap of claim 3, further comprising an LED status display that indicates conditions of power, receiving data, and output port status.

7. The addressable tap of claim 3, wherein the switchboard further comprises a splitter switch combination, port powering, and status indicators.

8. The addressable tap of claim 3, wherein the controller further comprises an address range stored in memory such that any individual addressable tap and addressable port can be remotely controlled.

9. The addressable tap of claim 3, wherein the connect command is processed by the controller when two consecutive transactions out of six match.

10. The addressable tap of claim 3, wherein the disconnect command is processed by the controller when four consecutive transactions out of twelve match.

11. The addressable tap of claim 3, wherein the controller receives and processes a continuous stream of commands without dropping any commands.

* * * * *